(12) United States Patent
Kartoun et al.

(10) Patent No.: US 11,429,899 B2
(45) Date of Patent: Aug. 30, 2022

(54) DATA MODEL PROCESSING IN MACHINE LEARNING USING A REDUCED SET OF FEATURES

(71) Applicants: International Business Machines Corporation, Armonk, NY (US); Massachusetts Institute of Technology, Cambridge, MA (US)

(72) Inventors: Uri Kartoun, Cambridge, MA (US); Kristen Severson, Somerville, MA (US); Kenney Ng, Arlington, MA (US); Paul D. Myers, Bloomfield Hills, MI (US); Wangzhi Dai, Cambridge, MA (US); Collin M. Stultz, Newton, MA (US)

(73) Assignees: International Business Machines Corporation, Armonk, NY (US); Massachusetts Institute of Technology, Cambridge, MA (US)

( * ) Notice: Subject to any disclaimer, the term of this patent is extended or adjusted under 35 U.S.C. 154(b) by 364 days.

(21) Appl. No.: 16/863,460

(22) Filed: Apr. 30, 2020

(65) Prior Publication Data

US 2021/0342735 A1 Nov. 4, 2021

(51) Int. Cl.
G05B 13/00 (2006.01)
G06N 20/00 (2019.01)
G06N 5/02 (2006.01)

(52) U.S. Cl.
CPC ............... *G06N 20/00* (2019.01); *G06N 5/02* (2013.01)

(58) Field of Classification Search
CPC ............ G06N 20/00; G06N 3/02; G06N 5/00; G06N 5/02; G06N 7/02; G05B 13/00; G06V 30/194; G10L 15/16
See application file for complete search history.

(56) References Cited

U.S. PATENT DOCUMENTS 7,415,445 B2   8/2008 Forman
7,542,959 B2   6/2009 Barnhill et al.
(Continued)

OTHER PUBLICATIONS

List of IBM Patents or Patent Applications Treated as Related, filed May 20, 2020.
(Continued)

*Primary Examiner* — Bo Hui A Zhu
(74) *Attorney, Agent, or Firm* — Edell, Shapiro & Finnan, LLC

(57) ABSTRACT

A computer system trains a predictive model. A plurality of subsets of features are selected from a dataset comprising a plurality of cases and controls and a plurality of features. Cases and controls are matched to select a plurality of case-control subsets for each subset of features, each case-control subset having similar values for the corresponding subset of features. For each case-control subset, a statistical significance of each feature of the plurality of features absent from the subset of features used to match the case-control subset is identified. A final subset of features is selected based on satisfying a statistical significance of each feature for the plurality of case-control subsets. A predictive model is trained using the final subset of features. Embodiments of the present invention further include a method and program product for training a predictive model in substantially the same manner described above.

20 Claims, 5 Drawing Sheets

(56) References Cited

U.S. PATENT DOCUMENTS

| | | | |
|---|---|---|---|
| 7,624,074 | B2 | 11/2009 | Weston et al. |
| 8,301,638 | B2 | 10/2012 | Xu et al. |
| 9,189,750 | B1 | 11/2015 | Narsky |
| 2005/0049913 | A1 | 3/2005 | Huddleston et al. |
| 2005/0131847 | A1 | 6/2005 | Weston et al. |
| 2005/0216426 | A1 | 9/2005 | Weston et al. |
| 2008/0004865 | A1 | 1/2008 | Weng et al. |
| 2008/0033899 | A1 | 2/2008 | Barnhill et al. |
| 2010/0193309 | A1* | 8/2010 | Gruber ............. F16F 9/368 188/322.18 |
| 2011/0078099 | A1 | 3/2011 | Weston et al. |
| 2011/0307437 | A1 | 12/2011 | Aliferis et al. |
| 2016/0110656 | A1 | 4/2016 | Yamada et al. |
| 2019/0108915 | A1* | 4/2019 | Spurlock, III ..... C07K 16/2866 |
| 2019/0311805 | A1* | 10/2019 | Linguraru ............ G06K 9/6256 |
| 2019/0370684 | A1 | 12/2019 | Gunes et al. |
| 2021/0343421 | A1 | 11/2021 | Kartoun et al. |

OTHER PUBLICATIONS

P. Myers, "Choosing Clinical Variables for Risk Stratification Post-Acute Coronary Syndrome." Scientific Reports, vol. 9, article No. 14631, 2019, 9 pages.

R. Guo et al., "A Survey of Learning Causality with Data: Problems and Methods." (Submitted on Sep. 25, 2018 (v1), last revised Apr. 19, 2019 (this version, v3)), 36 pages.

J. Ross et al. "Can machine learning complement traditional medical device surveillance? A case study of dual-chamber implantable cardioverter-defibrillators." Medical Devices (Auckland, N.Z.) vol. 10, pp. 165-188. Aug. 16, 2017, 28 pages.

W. Rivera, "A Priori Synthetic Sampling for Increasing Classification Sensitivity in Imbalanced Data Sets." Ph.D. dissertation, College of Engineering and Computer Science at the University of Central Florida Orlando, Florida, 2016, 245 pages.

M Ammad-Ud-Din et al., "Systematic identification of feature combinations for predicting drug response with Bayesian multi-view multi-task linear regression." Bioinformatics, 33, i359-i368, 2017, 10 pages.

A. Chatterjee, et al., "Bootstrapping Lasso Estimators", Journal of the American Statistical Association, Jun. 2011, vol. 106, No. 494, Theory and Methods, 18 pages.

H. Zou, "The Adaptive Lasso and Its Oracle Properties", Journal of the American Statistical Association, Dec. 2006, vol. 101, No. 476, Theory and Methods, 12 pages.

P. Myers, et al., "Machine Learning Improves Risk Stratification After Acute Coronary Syndrome", Scientific Reports, vol. 7, article No. 12692, 2017, 12 pages.

M. Paul, "Feature Selection as Causal Inference: Experiments with Text Classification", Proc. 21st Conference on Computational Natural Language Learning (CoNLL 2017), pp. 163-172, Vancouver, Canada, Aug. 3-Aug. 4, 2017, 10 pages.

K. Imai, et al., "Estimating Treatment Effect Heterogeneity in Randomized Program Evaluation", The Annals of Applied Statistics, vol. 7, No. 1, pp. 443-470, 2013, 28 pages.

J. Sekhon, "Package "Matching" (Multivariate and Propensity Score Matching with Balance Optimization)," May 2019, Version 4.9-6, 36 pages.

J. Tang, et al, "Feature Selection for Classification: A Review", https://www.cc.gatech.edu/~hic/CS7616/Papers/Tang-et-al-2014.pdf. Data classification: Algorithms and applications (2014): 37, 33 pages.

Wikipedia, "Feature selection", https://en.wikipedia.org/wiki/Feature_selection, downloaded from the internet on Apr. 30, 2020, 15 pages.

Wikipedia, "MELD-Plus", https://en.wikipedia.org/wiki/MELD-Plus, downloaded from the internet on Apr. 30, 2020, 4 pages.

K. A. A. Fox, et al., "Management of acute coronary syndromes. Variations in practice and outcome", Findings from the Global Registry of Acute Coronary Events (GRACE), European Heart Journal (2002) 23, 1177-1189, https://www.ncbi.nlm.nih.gov/pubmed/12127920, 13 pages.

R. Guo, et al., "A Survey of Learning Causality with Data: Problems and Methods", arXiv:1809.09337v3 [cs.AI], Apr. 19, 2019, 36 pages.

J. Ross, et al., "Can machine learning complement traditional medical device surveillance? A case study of dual-chamber implantable cardioverter-defibrillators", Medical Devices: Evidence and Research 2017:10 165-188, 24 pages.

W. Rivera, "a priori synthetic sampling for increasing classification sensitivity in imbalanced data sets", (2016) Electronic Theses and Dissertations, 2004-2019, 4895, 245 pages.

M.Ammad-Ud-Din, et al., "Systematic identification of feature combinations for predicting drug response with Bayesian multi-view multi-task linear regression", Bioinformatics, 33, 2017, i359-i368, 10 pages.

H. Zou, "The Adaptive Lasso and it's Oracle Properties", Journal of the American Statistical Association, 101:476; 1418-1429, DOI: 10.1198/016214506000000735, (2006), 13 pages.

* cited by examiner

DATA MODEL PROCESSING IN MACHINE LEARNING USING A REDUCED SET OF FEATURES

BACKGROUND

1. Technical Field

Present invention embodiments relate to machine learning, and more specifically, to improving the computerized performance of data models used in machine learning by using a reduced quantity of features.

2. Discussion of the Related Art

In the field of machine learning, feature selection, also known as variable selection or attribute selection, refers to the process of selecting relevant data features for use in model construction. While a dataset can contain any number of features, feature selection techniques identify a subset of features that are the most useful for a data model. In particular, features that are irrelevant or redundant can typically be omitted from consideration without negatively impacting the performance of a corresponding data model. In fact, models with fewer features are typically preferable since such models are more computationally efficient and more interpretable.

SUMMARY

According to one embodiment of the present invention, a computer system trains a predictive model. A plurality of subsets of features are selected from a dataset comprising a plurality of cases and controls and a plurality of features. Cases and controls are matched to select a plurality of case-control subsets for each subset of features, each case-control subset having similar values for the corresponding subset of features. For each case-control subset, a statistical significance of each feature of the plurality of features absent from the subset of features used to match the case-control subset is identified. A final subset of features is selected based on the statistical significance of each feature for the plurality of case-control subsets. A predictive model is trained using the final subset of features. Embodiments of the present invention further include a method and program product for training a predictive model in substantially the same manner described above. Thus, present invention embodiments increase processing efficiency of predictive models by reducing the number of feature values that are processed by a predictive model, thereby reducing the total number of computational operations required to forecast an outcome. Moreover, present invention embodiments ensure that selecting fewer features for a predictive model does not cause an unacceptable reduction in the accuracy of the model.

Various other embodiments of the present invention will now be discussed. In some embodiments, the predictive model is applied to predict outcomes. Thus, unknown outcomes can be predicted more efficiently while ensuring the accuracy of forecasted outcomes. In some embodiments, a selection score is determined for each feature of the plurality of features, wherein the selection score corresponds to a number of case-control subsets in which the statistical significance of the feature satisfies a significance threshold value, and the plurality of features are ranked by selection score to select the final subset of features having selection scores that satisfy a selection threshold value. By selecting features that are the most statistically significant across a large number of different case-control subsets, present invention embodiments ensure that a model is trained on features most likely to be highly relevant to the outcome. In some embodiments, the significance threshold value comprises a probability score of the feature. By using a probability score, significance of different types of features can all be compared, including categorical features, continuous features that are normally distributed, and continuous features not normally distributed. In some embodiments, the selection threshold value comprises a percentage of case-control subsets in which the statistical significance of the feature satisfies the significance threshold value. Thus, features that are significant to outcome in a large number of case-control subsets can be identified, improving feature selection robustness. In some embodiments, the predictive model is evaluated against a reference model to validate accuracy of the predictive model, wherein the reference model is trained using the dataset. By evaluating a predictive model's performance, present invention embodiments can ensure that the model's predictions are more accurate in comparison with commonly used feature selection methods. In some embodiments, each case-control subset is matched according to propensity score matching with a caliper value and a case-control ratio value. Thus, a subset of cases is matched to controls that are most similar in terms of the values of the features used to match the cases and controls.

BRIEF DESCRIPTION OF THE DRAWINGS

Generally, like reference numerals in the various figures are utilized to designate like components.

DETAILED DESCRIPTION

Figure 1:
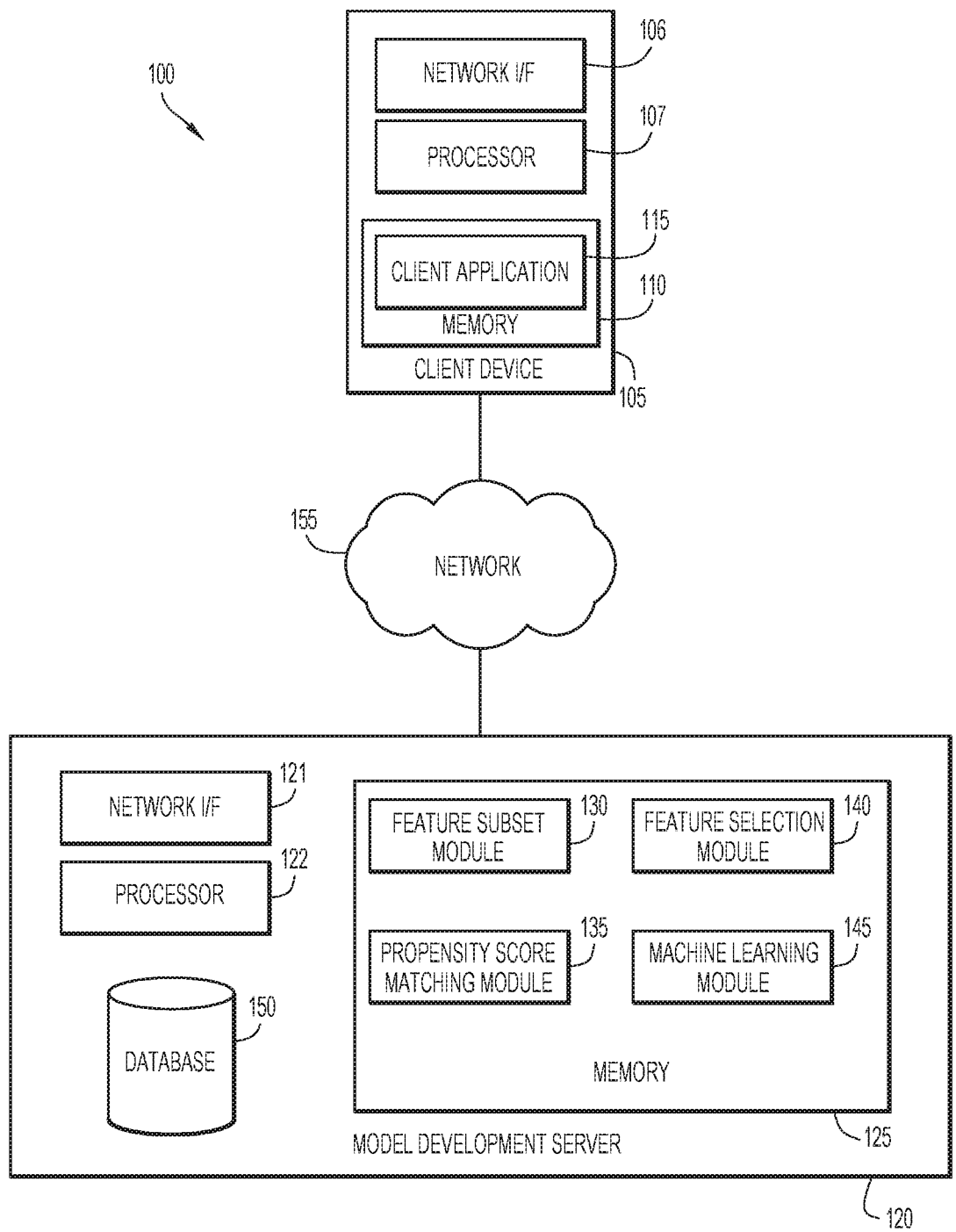
FIG. 1 is a block diagram depicting a computing environment for model development in accordance with an embodiment of the present invention.

Present invention embodiments relate to machine learning, and more specifically, to improving the computerized processing of data models used in machine learning by using a reduced quantity of features while maintaining accuracy. A predictive model refers to a data model that processes input data to forecast a selected outcome. For example, a predictive model may process clinical data of a patient to determine the most likely outcome of the patient (e.g., recovery from a disease). In order to develop such a model, machine learning techniques may be applied to train the model using a training sample of example clinical data that includes both types of outcome (e.g., recovered vs. not recovered from a disease). A feature selection technique may identify certain data features in particular that are most useful as indicators of, or proxies for, the outcome of interest; the selected features are then used to develop a predictive model. It should be noted that the term "feature" could also be referred as "variable," "covariate", or "attribute".

The quality of a model (i.e., determined by calculating prediction accuracy) can depend on the selected features that are represented in the model's training data. In particular, some features may be highly correlated to the outcome, some features may be weakly correlated, and some features may be entirely irrelevant to outcome. Some features may be highly correlated to the outcome, but may be also correlated with each other, thus being possibly redundant. In general, a model that is trained on relevant features should be able to forecast outcome more accurately than a model that is trained using irrelevant or redundant features. Moreover, a model that is trained using a larger number of selected features may be more accurate than a model that is trained using a fewer number of features, assuming that the features are all relevant. However, an objective of feature selection is to select a limited number of relevant features, because a model's computational requirements scale with the number of features that are processed. In addition, the interpretability of a model becomes more difficult as the number of features increase. Furthermore, some features may be difficult to acquire (e.g., by high cost or by time), and if found to be non-informative or redundant, a model would benefit from not relying on such features. Values for certain laboratory observations, for example, may take a few days to acquire, and may also be associated with a high cost. Other features, on the other hand, are easier to acquire (e.g., age, gender, comorbidities stored in the patient's historical profile). Unlike conventional approaches in which treatment effects are adjusted relative to a set of features, present invention embodiments apply propensity score matching to match an outcome relative to features.

Present invention embodiments perform enhanced feature selection in order to reduce the number of features used to train a model without negatively impacting the model's accuracy. Compared to commonly used feature selection techniques, present invention embodiments can achieve a significant reduction (up to 50%) in the number of features, resulting in much more efficient models and increased computer processing performance. In particular, subpopulations of a dataset are identified and analyzed to select features that are highly relevant to forecasting outcome.

Thus, any data-related application, including such use cases as health care, user analytics, and the like, may benefit from an increase in performance realized by present invention embodiments. Moreover, present invention embodiments increase processing efficiency by reducing the number of features that are processed by a predictive model, thereby reducing the total number of computational operations required to forecast an outcome. Thus, present invention embodiments can achieve accuracy results that are on par with, or even superior to conventional techniques, while only utilizing a fraction of the computational resources of those techniques.

Various other embodiments of the present invention will now be discussed. In some embodiments, the predictive model is applied to predict outcomes. Thus, outcomes can be predicted more efficiently while ensuring the accuracy of forecasted outcomes. In some embodiments, a selection score is determined for each feature of the plurality of features, wherein the selection score corresponds to a number of case-control subsets in which the statistical significance of the feature satisfies a significance threshold value, and the plurality of features are ranked by selection score to select the final subset of features having selection scores that satisfy a selection threshold value. By selecting features that are the most statistically significant across a large number of different case-control subsets, present invention embodiments ensure that a model is trained on features most likely to be highly relevant to outcome. In some embodiments, the significance threshold value comprises a probability score of the feature. By using a probability score, significance of different types of features can all be compared, including categorical features, continuous features that are normally distributed, and continuous features not normally distributed. In some embodiments, the selection threshold value comprises a percentage of case-control subsets in which the statistical significance of the feature satisfies the significance threshold value. Thus, features that are significant to outcome in a large number of case-control subsets can be identified, improving feature selection robustness. In some embodiments, the predictive model is evaluated against a reference model to validate accuracy of the predictive model, wherein the reference model is trained using the dataset. By evaluating a predictive model's performance, present invention embodiments can ensure that the model's predictions are more accurate in comparison with commonly used feature selection methods. In some embodiments, each case-control subset is matched according to propensity score matching with a caliper value and a case-control ratio value. Thus, a subset of cases is matched to controls that are most similar in terms of the values of the features used to match the cases and controls.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for model development in accordance with an embodiment of the present invention. As depicted, computing environment 100 includes a client device 105, a model development server 120, and a network 155. It is to be understood that the functional division among components of computing environment 100 have been chosen for purposes of explaining present invention embodiments and is not to be construed as a limiting example.

Client device 105 includes a network interface (I/F) 106, at least one processor 107, and memory 110 that includes a client application 115. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 155. In general, client device 105 enables a user to perform, at model development server 120, model development operations, including feature selection, model training and testing, subpopulation analysis, and/or other tasks in accordance with present invention embodiments. Client device 105 may include internal and external hardware components, as depicted and described in further detail with respect to FIG. 5.

Client application 115 may include one or more modules or units to perform various functions of present invention embodiments described below. Client application 115 may be implemented by any combination of any quantity of software and/or hardware modules or units, and may reside within memory 110 of client device 105 for execution by a processor, such as processor 107.

Client application 115 may send instructions to model development server 120 to perform one or more operations related to data modeling. A user of client application 115 can provide one or more datasets to model development server 120 by uploading datasets or otherwise indicating locations of local and/or network-accessible datasets. Client application 115 may enable a user to submit a model development request, which can specify feature selection algorithms, machine learning algorithms, statistical techniques used to measure performance of data models, acceptable ranges of input values used to identify subpopulations, and the like. Additionally or alternatively, a user of client device 105 may, via client application 115, select trained models and apply selected models to various data processing tasks.

Model development server 120 includes a network interface (I/F) 121, at least one processor 122, and memory 125. Memory 125 may include a feature subset module 130, a propensity score matching module 135, a feature selection module 140, and a machine learning module 145. Model development server 120 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 121 enables components of model development server 120 to send and receive data over a network, such as network 155. In general, model development server 120 and its modules develop models using enhanced feature selection techniques, and apply developed models to data processing tasks in accordance with present invention embodiments. Model development server 120 may include internal and external hardware components, as depicted and described in further detail with respect to FIG. 5.

Feature subset module 130, propensity score matching module 135, feature selection module 140, and machine learning module 145 may include one or more modules or units to perform various functions of present invention embodiments described below. Feature subset module 130, propensity score matching module 135, feature selection module 140, and machine learning module 145 may be implemented by any combination of any quantity of software and/or hardware modules or units, and may reside within memory 125 of model development server 120 for execution by a processor, such as processor 122.

Feature subset module 130 processes an input dataset containing features and outcomes to identify different subsets of features for use in subpopulation analysis. A dataset may include a plurality of records that each include values for various features and outcomes. Each feature, also referred to as a covariate or variable or attribute, includes a value that describes a record in some manner. For example, a clinical dataset may include features of age, gender, disease status, laboratory observation, administered medication status, and the like, along with an outcome of interest. Additionally or alternatively, features can be extracted from clinical narrative notes using conventional or other natural language processing techniques. Thus, each record in the clinical dataset includes values for the features that together describe a patient. Additionally, each record specifies an outcome (e.g., "recovered" or "not recovered"). Records that include true values (e.g., "1") for the outcome of interest are referred to as cases, and records that include false values (e.g., "0") for the outcome of interest are referred to as controls. In some embodiments, a dataset may be arranged as a tabular two-dimension data frame. For example, a set of clinical data that describes 43,000 patients in terms of 199 features may have 200 columns (one for each of the 199 features, and one indicating an outcome) and 43,000 rows (each of which includes a single patient's values for the 199 features and an outcome).

Feature subset module 130 identifies different subsets of features by randomly assigning features to subsets. The number of features that feature subset module 130 assigns to a given subset may be predetermined or defined by some input parameter, which can be provided by a user of client device 105. In some embodiments, a subset's number of features may be much smaller than the overall number of features of a dataset. For example, in a dataset containing 199 features, each subset may include ten features. In some embodiments, feature subset module 130 assigns features to subsets using an exhaustive approach until all of a dataset's features are assigned. For example, in a dataset of 199 features and an outcome, ten features may be selected at random out of the 199 for a first subset, another ten features may be randomly selected out of the remaining 189 features, etc. In some embodiments, features are randomly selected out of the entire available set of features, resulting in different subsets that may share one or more features in common.

In some embodiments, feature subset module 130 generates a predetermined or defined number of subsets of features. Alternatively, feature subset module 130 may exhaustively assign features until there are no remaining unassigned features in a dataset. Feature subset module 130 may identify a subset of features for each unique combination of features.

Propensity score matching module 135 applies one or more propensity score matching techniques to a dataset to identify, for each subset of features, a subset of cases and controls that are similar in terms of their values for the subset of features. In particular, propensity score matching module 135 identifies case-control subsets by applying propensity score matching and filtering results using a caliper value and a case-control ratio value. The propensity score matching is based on the outcome variable and on the subset of features selected by feature subset module 130. In particular, a propensity score can be calculated for feature of a record with respect to the outcome, and caliper values and case-control ratio values are used to filter the results to identify matchings. The propensity score for a particular record is defined as the conditional probability of the outcome given the record's feature values. A caliper value is a numerical value that is multiplied with a standard deviation for a selected case value to define a range of acceptable control values that can be matched with the case. Equations (1) and (2) define the minimum and maximum values that a control must have to be matched to a case.

Minimum control value=(case value)−(caliper value)×(standard deviation of value for cases)   (1)

Maximum control value=(case value)+(caliper value)×(standard deviation of value for cases)   (2)

For example, for a feature of patient age, if a control has a value of 72 years and the standard deviation of control age values in the dataset is 10 years, then a caliper value of 0.25 indicates that the control may be matched with a case if the control has an age value of 72 years±0.25×10 years. Thus, the age of a selected control must be between 69.5 years and 74.5 years.

Propensity score matching module 135 may apply a same caliper value to all of the feature values for a given case record in order to find a control record having corresponding feature values that are all acceptable. Thus, if a dataset does not contain any control record that matches a case on all feature values, then the case may be dropped from consideration. Propensity score matching module 135 may apply caliper values and case-control ratio values that are predefined or user-defined.

Thus, propensity score matching module 135 identifies a case-control subset for each feature subset, with each case-control subset containing both cases and controls that share similar values for features of the corresponding feature subset, but have different outcomes (as cases have different outcomes from controls by definition). Each case-control subset identified by propensity score matching module 135 is processed by feature selection module 140 to select features, which are used by machine learning module 145 to train and evaluate a model using the selected features.

Feature selection module 140 analyzes values of features of each case-control subset to identify features that are associated with the outcome in a statistically significant manner. Specifically, while a case-control subset includes cases and controls that have very similar values for the subset of features used to match those cases and controls, feature selection module 140 analyzes values of cases and controls for the features that were not included in the subset of features. For example, if a case-control subset contains records that are matched according to a subset of ten particular features, and a dataset has 199 features overall, then feature selection module 140 will analyze the values for the remaining 189 features in order to identify features that are relevant to distinguishing the difference in outcome between cases and controls.

Feature selection module 140 applies univariate analysis to each feature that was not used for matching in order to determine the statistical significance of each feature with respect to forecasting outcome. Feature selection module 140 may represent statistical significance by computing a probability value (p-value) for each feature. In various embodiments, feature selection module 140 applies a chi-square test for features having categorical variables, applies a t-test for features having normally-distributed variables, and applies a non-parametric test for features having continuous variables that are not normally distributed.

Once feature selection module 140 determines p-values for each feature of a case-control subset, excluding the features used to match cases to controls, feature selection module 140 may rank the features according to p-value. Feature selection module 140 may determine whether each feature of a case-control subset has a p-value that satisfies a predetermined significance threshold. For example, feature selection module 140 may identify features having a p-value of less than 0.001. Feature selection module 140 may assign a selection score for each feature that corresponds to the number of case-control subsets in which the feature's p-value satisfies the significance threshold. For example, feature selection module 140 may assign a single point to a feature's selection score for every instance of the feature's p-value that satisfies a significance threshold in a given case-control subset.

When feature selection module 140 has processed all of the case-control subsets to obtain selection scores for each feature in a dataset, the features may be ranked according to selection score, and a final subset of features may be selected for training a model. In some embodiments, feature selection module 140 compares the selection scores of each feature to a selection threshold value, and selects all features that satisfy the selection threshold value. In some embodiments, feature selection module 140 selects a predefined number of features having the highest selection scores. In some embodiments, feature selection module 140 selects features whose selection scores are at or above a particular percentile (e.g., a top 5% of features).

Machine learning module 145 trains data models, using the values of selected features, to perform outcome forecasting. Machine learning module 145 may train a data model using the features selected by feature selection module 140 to forecast outcomes. Machine learning module 145 may train models using the selected feature values for all records of a dataset, or may train models using the selected feature values for a subpopulation of a dataset. Machine learning module 145 may apply conventional or other machine learning techniques to train models. In some embodiments, machine learning module 145 utilizes logistic regression to train a predictive model.

Machine learning module 145 may evaluate trained models to measure and compare the accuracy of models. In particular, machine learning module 145 may test a model by applying the model to a testing set of records to compare outcomes forecasted by the model to the actual outcomes. A dataset used to train a model may also be used to test the model. For example, 67% of the cases and controls of a dataset may be used to train a model, and the remaining 33% may be reserved for subsequently testing the model. When a dataset is divided into a testing set and a training set, individual records may be randomly assigned to one set or the other in a manner that preserves the overall ratio of cases and controls.

In some embodiments, machine learning module 145 measures a model's performance by identifying the true positives and false positives at various discrimination threshold levels. A discrimination threshold defines the threshold for an output probability value to be considered a positive. For example, if a discrimination threshold is 0.5, then a probability value of 0.6 that is returned by a model is considered a positive, and a probability value of 0.4 is considered a negative. Thus, a discrimination threshold of, for example, 0.1, would be expected to return more false positives than a discrimination threshold of 0.5 for a given model.

The true positives and false positives for various discrimination thresholds are used to construct a receiver operating characteristic curve for a model. A receiver operating characteristic curve is a graphical plot of true positives against false positives at various discrimination thresholds. An area under the curve (AUC) of a receiver operating characteristic curve can then be computed by machine learning module 145. In general, an AUC is equal to the probability that the tested model will rank a randomly chosen positive instance higher than a randomly chosen negative one (assuming positive instances rank higher than negative instances). Inputs and/or outputs of machine learning module 145 may be normalized such that AUC values calculated by machine learning module 145 range between 0 and 1. An AUC of 0.5 may indicate that the case and control values upon which a model is trained are so similar to each other that the resulting trained model cannot discriminate cases from controls, whereas an AUC of 1.0 may indicate that the two groups can be perfectly distinguished by the model. Thus, a predictive model that has a higher AUC value is more accurate than a model having a lower AUC value. It should be appreciated that AUC values can be computed directly using inputs of true positives and corresponding false positives at two or more discrimination threshold levels; thus, it is unnecessary to generate a graphical plot of a receiver operating characteristic curve. Rather, any mathematical technique for approximating definite integrals can be applied to calculate AUC values. For example, trapezoidal rule approximation or Riemann sum approximation can be used to calculate AUC values.

An AUC value of a model trained using features selected according to a present invention embodiment can be compared to one or more models trained using other feature selection techniques in order to compare the performance of each model. For example, a model trained using features selected by feature selection module 140 can be compared to a reference model that is trained on the same dataset but whose features are selected using another technique, such as a random forest feature selection method or a least absolute shrinkage and selection operator (LASSO) method.

Database 150 may include any non-volatile storage media known in the art. For example, database 150 can be implemented with a tape library, optical library, one or more independent hard disk drives, or multiple hard disk drives in a redundant array of independent disks (RAID). Similarly, data in database 150 may conform to any suitable storage architecture known in the art, such as a file, a relational database, an object-oriented database, and/or one or more tables. In some embodiments, database 150 may store data related to model development, including input datasets, training datasets, testing datasets, and resulting trained models.

Network 155 may include a local area network (LAN), a wide area network (WAN) such as the Internet, or a combination of the two, and includes wired, wireless, or fiber optic connections. In general, network 155 can be any combination of connections and protocols known in the art that will support communications between client device 105 and model development server 120 via their respective network interfaces in accordance with embodiments of the present invention.

Figure 2:
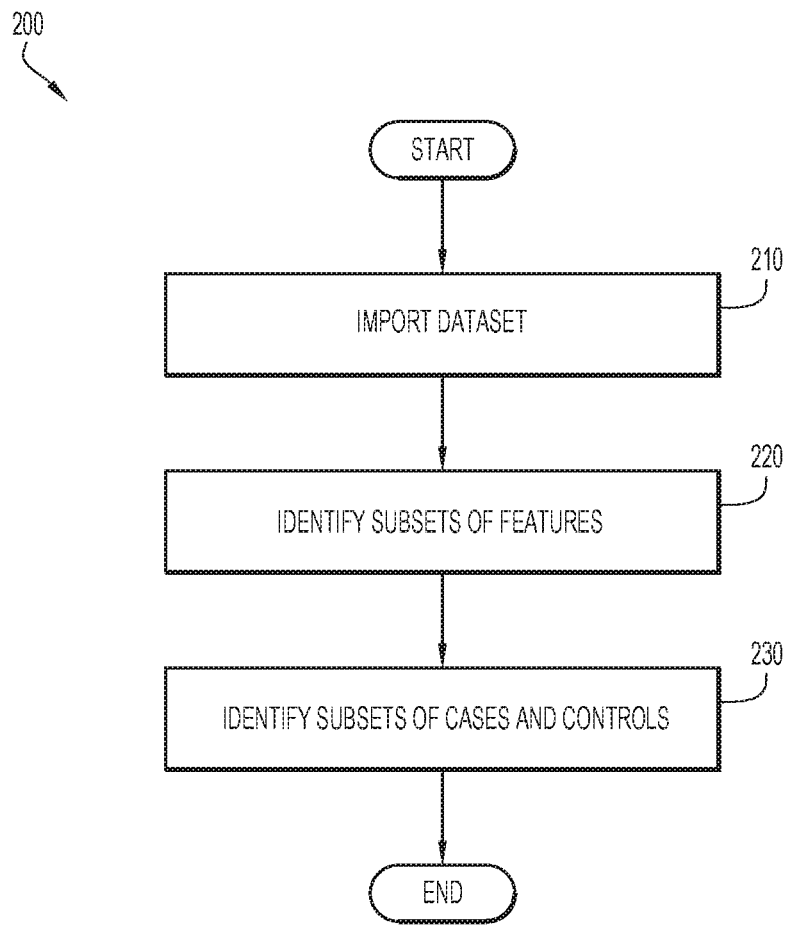
FIG. 2 is a flow chart depicting a method of matching cases and controls in accordance with an embodiment of the present invention.

FIG. 2 is a flow chart depicting a method 200 of matching cases and controls in accordance with an embodiment of the present invention.

A dataset is imported at operation 210. Feature subset module 130 may import a dataset from database 150, or client application 115 may provide feature selection module 130 with a dataset. The imported dataset may include records with values indicated for each feature (e.g., "age," "gender," "blood type," etc.), as well as an outcome of interest for a model being trained (e.g., "not recovered" or "recovered"). Cases may include any records that include true values for the outcome, and controls may include any records that include false values for the outcome.

Subsets of features are identified at operation 220. Feature subset module 130 may identify different subsets of features by randomly assigning features of the dataset into subsets. The number of features that feature subset module 130 assigns to a given subset may be predetermined or defined by a predetermined or user-indicated value. Features may be randomly selected from a dataset's entire set of features for every subset, or a feature may be removed from the pool of assignable features when the feature is assigned to a subset.

Case-control subsets are identified at operation 230. Given a subset of features, propensity score matching module 135 may match cases in an input dataset with controls whose values for the subset of features are similar. Propensity score matching module 135 may select a control whose value for a given feature falls within an acceptable range of a case's value for the feature, which can be defined according to a caliper value multiplied by a standard deviation of the feature among cases. Propensity score matching module 135 matches controls to cases according to a proportion indicated by a provided case-control ratio value.

Figure 3:
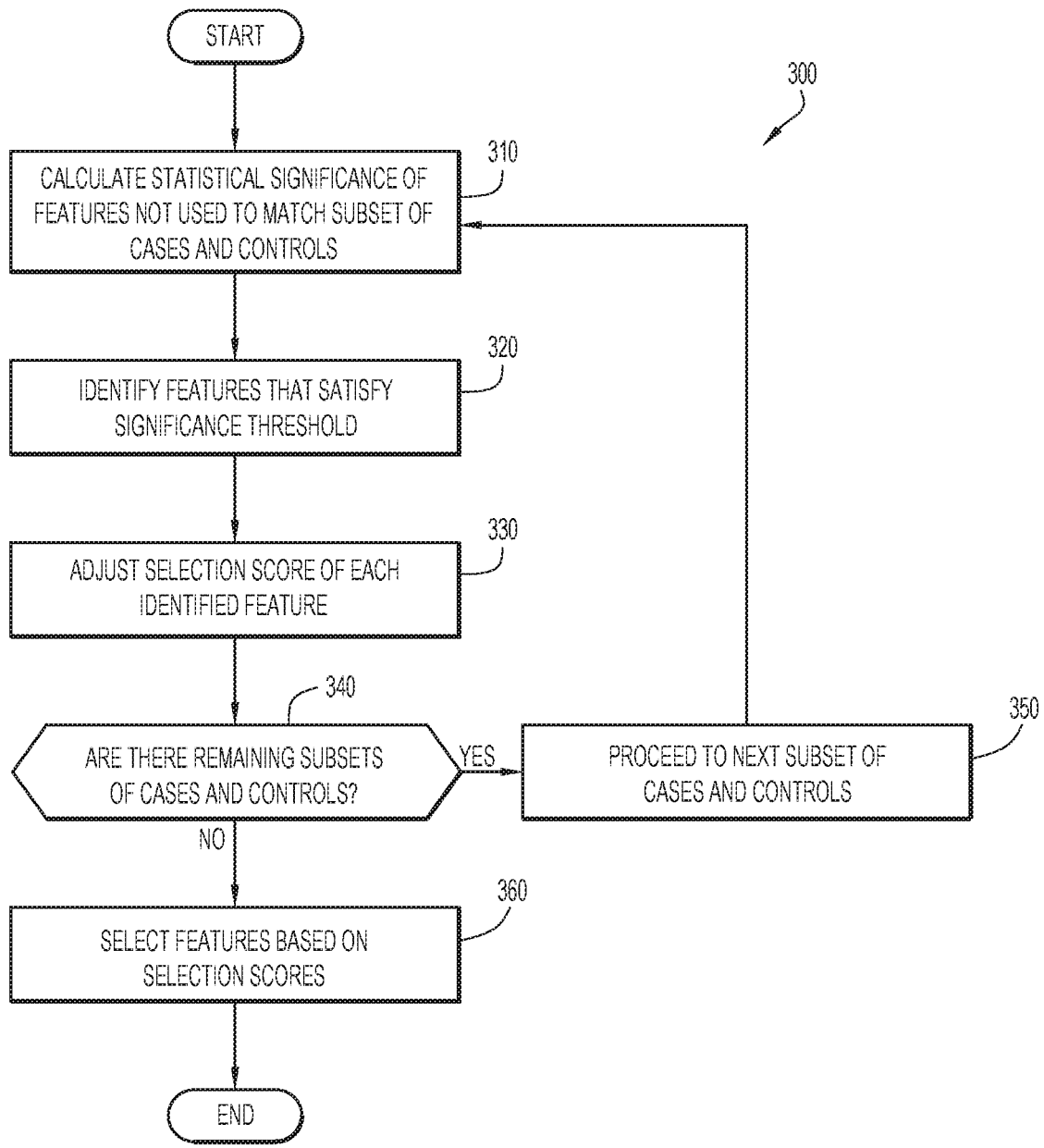
FIG. 3 is a flow chart depicting a method of selecting features in accordance with an embodiment of the present invention.

FIG. 3 is a flow chart depicting a method 300 of selecting features in accordance with an embodiment of the present invention.

A case-control subset is analyzed to calculate the statistical significance of features that were not used to match cases to controls for the selected case-case subset at operation 310. The statistical significance of a feature is determined with respect to the feature's probability of being correlated with an outcome. Feature selection module 140 may compute a p-value for each feature of a case-control subset, excluding the features used to match the records of the case-control subset.

Features of a case-control subset whose statistical significance satisfy a significance threshold are identified at operation 320. Feature selection module 140 may compare a probability value (p-value) of a feature to a predetermined threshold to identify features that are particularly significant. For example, feature selection module 140 may identify a feature when the feature's p-value is less than 0.001, less than or equal to 0.05, and the like.

A selection score for each identified feature is adjusted at operation 330. Each feature that is identified using the significance threshold may be noted by increasing a value of the feature's selection score. For example, a point may be rewarded to a feature every time that the feature is identified as significant in a particular case-control subset.

Operation 340 determines whether there are any remaining case-control subsets whose features have not yet been evaluated in terms of statistical significance. If there are any additional unprocessed case-control subsets, then a next case-control subset is selected at operation 350 and its features are processed to identify significant features and to update the selection scores of identified features.

When all of the case-control subsets have been processed, a final set of features is selected based on the selection scores at operation 360. In some embodiments, feature selection module 140 compares the selection scores of each feature to a selection threshold value, and selects any features that satisfy the selection threshold value. In some embodiments, feature selection module 140 selects a predefined number of features having the highest selection scores. In some embodiments, feature selection module 140 selects features whose selection scores are at or above a particular percentile.

Figure 4:
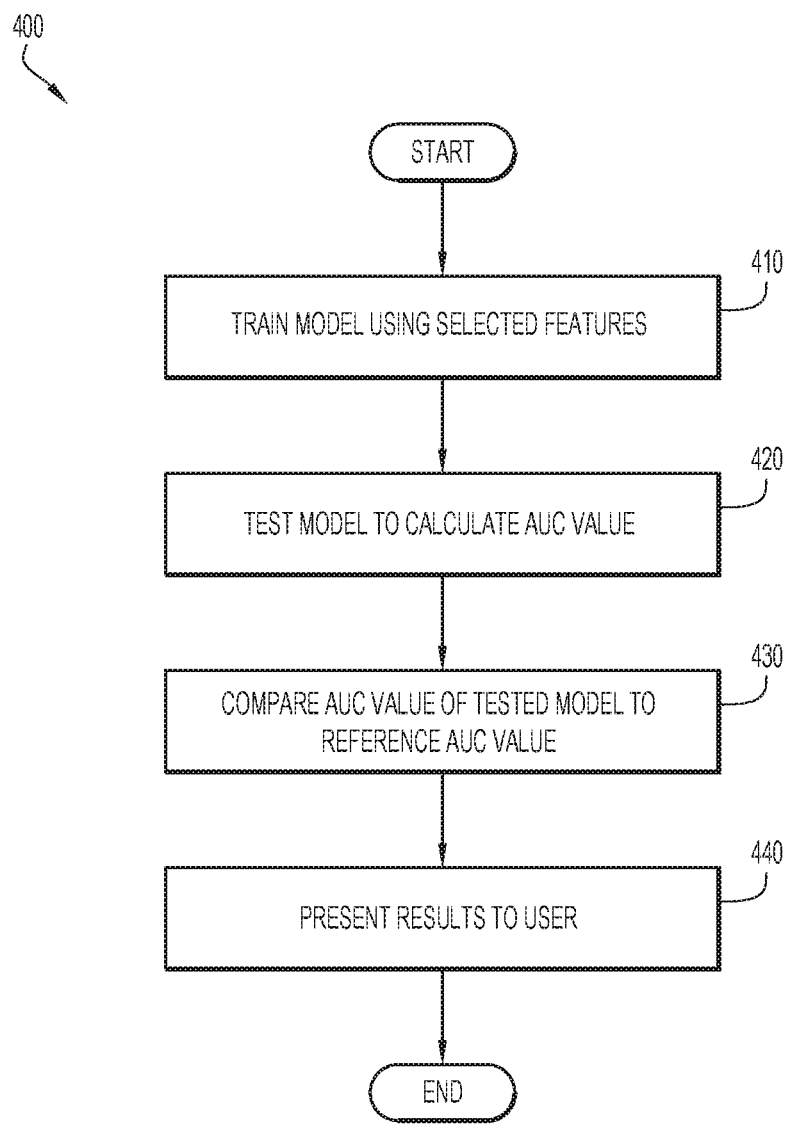
FIG. 4 is a flow chart depicting a method of evaluating model performance in accordance with an embodiment of the present invention.

FIG. 4 is a flow chart depicting a method 400 of evaluating model performance in accordance with an embodiment of the present invention.

A model is trained using selected features at operation 410. The model may be trained to forecast outcomes using conventional or other machine learning techniques. In particular, the model is trained using the final set of features selected in accordance with a present invention embodiment (e.g., the set of features selected using method 300). The model may be trained using training data extracted from the same dataset that is used for feature selection. In various embodiments, models may include any conventional or other logistical regression models.

The model is tested to calculate an AUC value at operation 420. A testing set of data, which may also be extracted from the same dataset used to train the model, may be processed by the model to identify false positives and true positives across various discrimination thresholds. Machine learning module 145 may then calculate the area under a receiver operating characteristic curve corresponding to the false positives and true positives.

The AUC value of the tested model is compared to a reference AUC value at operation 430. The reference AUC value may be computed similarly to the AUC value of the tested model using a different model. If the AUC values are close, then the tested model's accuracy is approximately the same as the reference model's accuracy. If the AUC value of the tested model is higher than the reference AUC value, then the tested model may forecast outcomes more accurately than the reference model. Thus, when a tested model uses fewer features than the reference model, and both models have comparable AUC values, then the tested model demonstrates superior efficiency and should be recommended over the reference model.

Results of testing the model are presented to a user at operation 440. Results may be transmitted to client device 105 for review by a user, and may include a summary of the tested model's performance against one or more other models. Thus, a user may select a test model when the test model demonstrates acceptable accuracy and efficiency. The selected model may then be provided with input data and applied to forecast outcomes. The model with fewer features may be automatically selected and utilized to generate outcomes, thus saving computing resources while identifying outcomes at an acceptable or improved level of accuracy.

Figure 5:
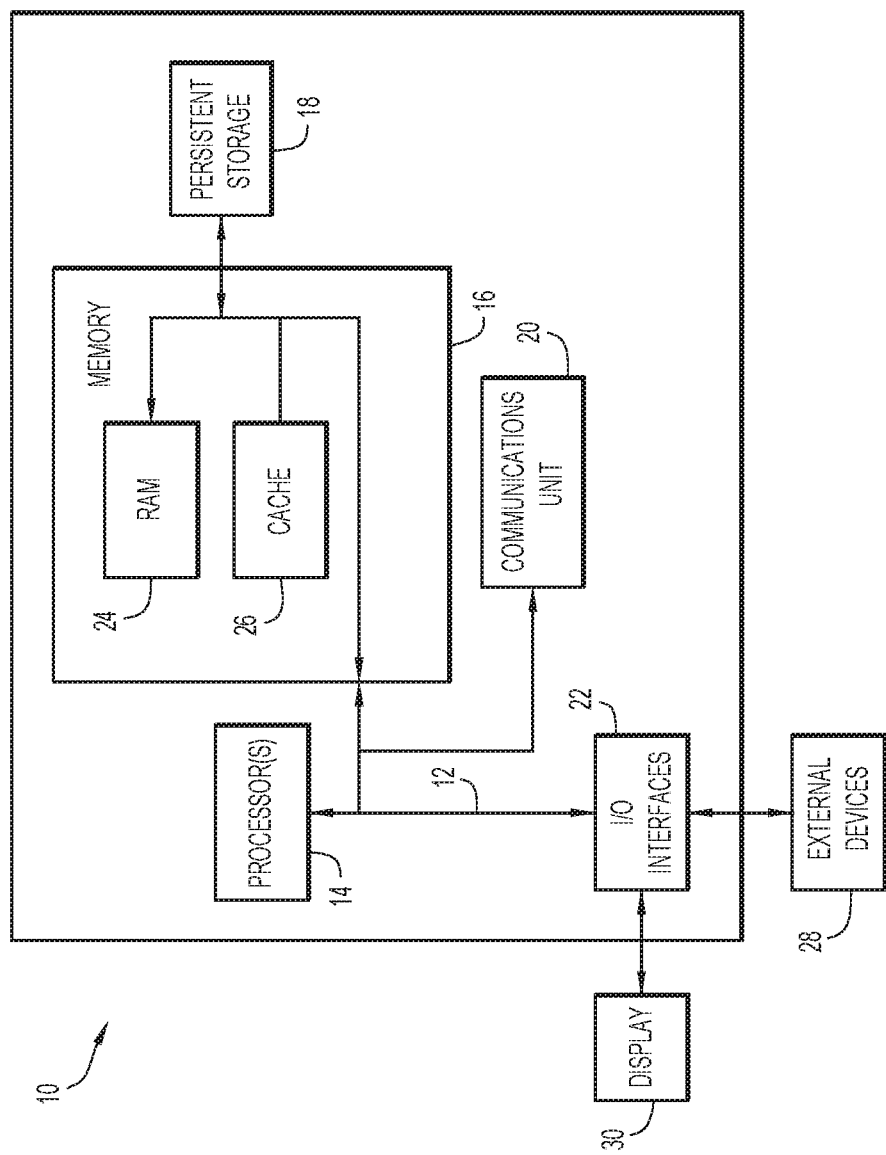
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 105 and/or model development server 120 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to improving the computerized processing of data models by using a reduced quantity of features while maintaining accuracy (e.g., input datasets and corresponding metadata, trained model data, model performance data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105 and model development server 120 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to improving the computerized processing of data models by using a reduced quantity of features while maintaining accuracy (e.g., input datasets and corresponding metadata, trained model data, model performance data, etc.) may include any information provided to, or generated by, client device 105 and/or model development server 120. Data relating to improving the computerized processing of data models by using a reduced quantity of features while maintaining accuracy may include any desired format and arrangement, and may include any quantity of any types of fields of any size to store any desired data. The data relating to improving the computerized processing of data models by using a reduced quantity of features while maintaining accuracy may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to improving the computerized processing of data models by using a reduced quantity of features while maintaining accuracy), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving the computerized performance of data models by using a reduced quantity of features while maintaining accuracy.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client application 115, feature subset module 130, propensity score matching module 135, feature selection module 140, machine learning module 145, etc.). These systems may include any types of monitors and input devices (e.g., keyboard, mouse, voice recognition, etc.) to enter and/or view information.

It is to be understood that the software (e.g., communications software, server software, client application 115, feature subset module 130, propensity score matching module 135, feature selection module 140, machine learning module 145, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client application 115, feature subset module 130, propensity score matching module 135, feature selection module 140, machine learning module 145, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to improving the computerized processing of data models by using a reduced quantity of features while maintaining accuracy). The database system may be implemented by any number of any conventional or other databases, data stores or storage structures (e.g., files, databases, data structures, data or other repositories, etc.) to store information (e.g., data relating to improving the computerized processing of data models by using a reduced quantity of features while maintaining accuracy). The database system may be included within or coupled to the server and/or client systems. The database systems and/or storage structures may be remote from or local to the computer or other processing systems, and may store any desired data (e.g., data relating to improving the computerized processing of data models by using a reduced quantity of features while maintaining accuracy).

The present invention embodiments may employ any number of any type of user interface (e.g., Graphical User Interface (GUI), command-line, prompt, etc.) for obtaining or providing information (e.g., data relating to improving the performance of data models by enhancing feature selection using sub-population analysis), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in any relevant fields, including, but not limited to, processing various sets of data to develop models having improved computerized processing performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for training a predictive model comprising:
   selecting, from a dataset comprising a plurality of cases and controls and a plurality of features, a plurality of subsets of features;
   matching cases and controls to select a plurality of case-control subsets for each subset of features, each case-control subset having similar values for the corresponding subset of features;
   identifying, for each case-control subset, a statistical significance of each feature of the plurality of features absent from the subset of features used to match the case-control subset;
   selecting a final subset of features based on the statistical significance of each feature for the plurality of case-control subsets; and
   training a predictive model using the final subset of features.

2. The computer-implemented method of claim 1, further comprising:
   applying the predictive model to predict outcomes.

3. The computer-implemented method of claim 1, wherein selecting the final subset of features comprises:
   determining a selection score for each feature of the plurality of features, wherein the selection score corresponds to a number of case-control subsets in which the statistical significance of the feature satisfies a significance threshold value; and
   ranking the plurality of features by selection score to select the final subset of features having selection scores that satisfy a selection threshold value.

4. The computer-implemented method of claim 3, wherein the significance threshold value comprises a probability score of the feature.

5. The computer-implemented method of claim 3, wherein the selection threshold value comprises a percentage of case-control subsets in which the statistical significance of the feature satisfies the significance threshold value.

6. The computer-implemented method of claim 1, further comprising:
   evaluating the predictive model against a reference model to validate accuracy of the predictive model, wherein the reference model is trained using the dataset.

7. The computer-implemented method of claim 1, wherein each case-control subset is matched according to propensity score matching with a caliper value and a case-control ratio value.

8. A computer system for training a predictive model, the computer system comprising:
   one or more computer processors;
   one or more computer readable storage media;
   program instructions stored on the one or more computer readable storage media for execution by at least one of the one or more computer processors, the program instructions comprising instructions to:
   select, from a dataset comprising a plurality of cases and controls and a plurality of features, a plurality of subsets of features;
   match cases and controls to select a plurality of case-control subsets for each subset of features, each case-control subset having similar values for the corresponding subset of features;
   identify, for each case-control subset, a statistical significance of each feature of the plurality of features absent from the subset of features used to match the case-control subset;
   select a final subset of features based on the statistical significance of each feature for the plurality of case-control subsets; and
   train a predictive model using the final subset of features.

9. The computer system of claim 8, wherein the program instructions further comprise instructions to:
   apply the predictive model to predict outcomes.

10. The computer system of claim 8, wherein the program instructions to select the final subset of features comprise instructions to:
    determine a selection score for each feature of the plurality of features, wherein the selection score corresponds to a number of case-control subsets in which the statistical significance of the feature satisfies a significance threshold value; and rank the plurality of features by selection score to select the final subset of features having selection scores that satisfy a selection threshold value.

11. The computer system of claim 10, wherein the significance threshold value comprises a probability score of the feature.

12. The computer system of claim 10, wherein the selection threshold value comprises a percentage of case-control subsets in which the statistical significance of the feature satisfies the significance threshold value.

13. The computer system of claim 8, wherein the program instructions further comprise instructions to:
evaluate the predictive model against a reference model to validate accuracy of the predictive model, wherein the reference model is trained using the dataset.

14. The computer system of claim 8, wherein each case-control subset is matched according to propensity score matching with a caliper value and a case-control ratio value.

15. A computer program product for training a predictive model, the computer program product comprising one or more computer readable storage media collectively having program instructions embodied therewith, the program instructions executable by a computer to cause the computer to:
select, from a dataset comprising a plurality of cases and controls and a plurality of features, a plurality of subsets of features;
match cases and controls to select a plurality of case-control subsets for each subset of features, each case-control subset having similar values for the corresponding subset of features;
identify, for each case-control subset, a statistical significance of each feature of the plurality of features absent from the subset of features used to match the case-control subset;
select a final subset of features based on the statistical significance of each feature for the plurality of case-control subsets; and
train a predictive model using the final subset of features.

16. The computer program product of claim 15, wherein the program instructions further cause the computer to:
apply the predictive model to predict outcomes.

17. The computer program product of claim 15, wherein the program instructions to select the final subset of features cause the computer to:
determine a selection score for each feature of the plurality of features, wherein the selection score corresponds to a number of case-control subsets in which the statistical significance of the feature satisfies a significance threshold value; and
rank the plurality of features by selection score to select the final subset of features having selection scores that satisfy a selection threshold value.

18. The computer program product of claim 17, wherein the significance threshold value comprises a probability score of the feature.

19. The computer program product of claim 17, wherein the selection threshold value comprises a percentage of case-control subsets in which the statistical significance of the feature satisfies the significance threshold value.

20. The computer program product of claim 15, wherein the program instructions further cause the computer to:
evaluate the predictive model against a reference model to validate accuracy of the predictive model, wherein the reference model is trained using the dataset.

* * * * *